United States Patent
Sung et al.

(10) Patent No.: US 12,416,254 B2
(45) Date of Patent: Sep. 16, 2025

(54) PERFORMANCE ENHANCEMENT OF A CATALYST VIA EXHAUST GAS HYDROGEN ENRICHMENT

(71) Applicant: BASF MOBILE EMISSIONS CATALYSTS LLC, Iselin, NJ (US)

(72) Inventors: Shiang Sung, New York, NY (US); Chunxin Ji, Hillsborough, NJ (US); Pavel Ruvinskiy, Novosibirsk (RU)

(73) Assignee: BASF MOBILE EMISSIONS CATALYSTS, LLC, Iselin, NJ (US)

( * ) Notice: Subject to any disclaimer, the term of this patent is extended or adjusted under 35 U.S.C. 154(b) by 0 days.

(21) Appl. No.: 18/024,833

(22) PCT Filed: Sep. 7, 2021

(86) PCT No.: PCT/US2021/049240
§ 371 (c)(1),
(2) Date: Mar. 6, 2023

(87) PCT Pub. No.: WO2022/055852
PCT Pub. Date: Mar. 17, 2022

(65) Prior Publication Data
US 2024/0287926 A1    Aug. 29, 2024

Related U.S. Application Data

(60) Provisional application No. 63/075,550, filed on Sep. 8, 2020.

(51) Int. Cl.
*F01N 3/20* (2006.01)
*F01N 9/00* (2006.01)

(52) U.S. Cl.
CPC ............. *F01N 3/206* (2013.01); *F01N 9/00* (2013.01); *F01N 2240/30* (2013.01);
(Continued)

(58) Field of Classification Search
CPC ... F01N 3/206; F01N 3/20; F01N 9/00; F01N 2240/30; F01N 2560/024; F01N 2560/025;
(Continued)

(56) References Cited

U.S. PATENT DOCUMENTS

| 5,407,761 A | 4/1995 | Ovshinsky et al. |
| 6,193,929 B1 | 2/2001 | Ovshinsky et al. |

(Continued)

FOREIGN PATENT DOCUMENTS

| KR | 20190104558 A | 9/2019 |
| WO | WO-2016/070090 A1 | 5/2016 |

(Continued)

OTHER PUBLICATIONS

International Search Report for PCT Patent Application No. PCT/US2021/049240, Issued on Dec. 16, 2021, 4 pages.

*Primary Examiner* — Mark A Laurenzi
*Assistant Examiner* — Kelsey L Stanek
(74) *Attorney, Agent, or Firm* — DLA Piper LLP (US)

(57) ABSTRACT

The disclosure provides a system for treating an exhaust gas stream from a gasoline engine. The system is configured to introduce controlled quantities of hydrogen gas into the exhaust gas stream upstream of a catalyst article during a cold-start period. Further provided are related methods of treating such exhaust streams. Such systems and methods are useful in reducing a level of one or more of hydrocarbons, carbon monoxide, and nitrogen oxide in a gaseous exhaust stream from a gasoline engine.

24 Claims, 5 Drawing Sheets

(52) U.S. Cl.
CPC .. *F01N 2560/024* (2013.01); *F01N 2560/025* (2013.01); *F01N 2610/04* (2013.01); *F01N 2900/0408* (2013.01)

(58) Field of Classification Search
CPC ......... F01N 2610/04; F01N 2900/0408; B01D 53/94
USPC ......................................................... 60/295
See application file for complete search history.

(56) References Cited

U.S. PATENT DOCUMENTS

| | | | |
|---|---|---|---|
| 7,220,692 B2 | 5/2007 | Marshall et al. | |
| 8,101,146 B2 | 1/2012 | Fedeyko et al. | |
| 8,119,088 B2 | 2/2012 | Boorse et al. | |
| 8,293,182 B2 | 10/2012 | Boorse et al. | |
| 8,715,618 B2 | 5/2014 | Trukhan et al. | |
| 9,011,807 B2 | 4/2015 | Mohanan et al. | |
| 9,138,732 B2 | 9/2015 | Bull et al. | |
| 9,199,195 B2 | 12/2015 | Andersen et al. | |
| 9,321,009 B2 | 4/2016 | Wan et al. | |
| 9,352,307 B2 | 5/2016 | Stiebels et al. | |
| 9,480,976 B2 | 11/2016 | Rivas-Cardona et al. | |
| 2004/0241507 A1 | 12/2004 | Schubert et al. | |
| 2007/0246351 A1 | 10/2007 | Smola et al. | |
| 2008/0003470 A1 | 1/2008 | Christenson et al. | |
| 2008/0257751 A1 | 10/2008 | Smola et al. | |
| 2008/0274873 A1 | 11/2008 | Schubert | |
| 2010/0024542 A1 | 2/2010 | Yen et al. | |
| 2011/0236790 A1 | 9/2011 | Schubert | |
| 2013/0340413 A1 | 12/2013 | Chandler et al. | |
| 2014/0369890 A1* | 12/2014 | Hirabayashi | F01N 3/206 422/119 |
| 2016/0230255 A1 | 8/2016 | Young et al. | |
| 2016/0298514 A1* | 10/2016 | Raux | F01N 3/208 |
| 2018/0195469 A1 | 7/2018 | Hamad et al. | |
| 2019/0160427 A1* | 5/2019 | Deeba | B01J 35/23 |
| 2020/0032686 A1 | 1/2020 | Sung et al. | |
| 2020/0032688 A1 | 1/2020 | Sung et al. | |
| 2020/0032689 A1* | 1/2020 | Sung | F01N 9/00 |
| 2020/0102871 A1 | 4/2020 | Sung et al. | |

FOREIGN PATENT DOCUMENTS

| | | |
|---|---|---|
| WO | WO-2018/185655 A1 | 10/2018 |
| WO | WO-2018/185665 A1 | 10/2018 |

* cited by examiner

PERFORMANCE ENHANCEMENT OF A CATALYST VIA EXHAUST GAS HYDROGEN ENRICHMENT

This application is a national stage application of PCT/US2021/049240, filed Sep. 7, 2021 which claims priority to U.S. Provisional Patent Application No. 63/075,550, filed Sep. 8, 2020 the contents of which are incorporated by reference herein in their entirety.

The present disclosure relates to systems for treating an exhaust gas stream from a gasoline engine. The present disclosure also relates to a method of improving a catalytic activity of a catalytic article in the purification of such exhaust gas streams. The systems and method use hydrogen as a reductant in the exhaust gas stream.

Environmental regulations for emissions of gasoline engines are becoming more stringent each year. Increasingly stringent emissions regulations have driven the need for developing emission gas treatment systems with improved capacity to manage nitrogen oxides ($NO_x$), carbon monoxide (CO), and hydrocarbon (HC) emissions at low engine exhaust temperatures. A major challenge for various automobile manufacturers is meeting new environmental regulation limits, such as the non-methane hydrocarbon and nitrogen oxide (NMHC+$NO_x$) limit.

Exhaust gas from vehicles powered by gasoline engines is typically treated with one or more three-way conversion (TWC) automotive catalysts. TWC catalysts typically contain platinum group metals (PGMs), such as, for example platinum (Pt), palladium (Pd), and rhodium (Rh), and are effective to abate CO, HC, and $NO_x$ pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio is the mass ratio of air to fuel present in a combustion process such as in an internal combustion engine. The stoichiometric A/F ratio corresponds to the complete combustion of a hydrocarbon fuel, such as gasoline, to carbon dioxide ($CO_2$) and water. The symbol $\lambda$ is thus used to represent the result of dividing a particular A/F ratio by the stoichiometric A/F ratio for a given fuel, so that: $\lambda=1$ is a stoichiometric mixture, $\lambda>1$ is a fuel-lean mixture, and $\lambda<1$ is a fuel-rich mixture. Conventional gasoline engines having electronic fuel injection and air intake systems provide a continually varying air-fuel mixture that quickly and constantly cycles between lean and rich exhaust. TWC catalysts, however, are not effective for reducing $NO_x$ emissions when the gasoline engine runs lean. Further, it is well known that catalysts utilized to treat the exhaust of internal combustion engines are less effective during the so-called "cold-start" period, which is the time period at the beginning of the treatment process, when the exhaust gas stream and the exhaust gas treatment system (e.g., the TWC) are at low temperatures (i.e., below about 150° C.). At these low temperatures, exhaust gas treatment catalysts generally do not display sufficient catalytic activity for effectively treating HC, $NO_x$, and CO emissions. Though various exhaust gas treatment systems exist for the abatement of CO, HC, and $NO_x$ during cold-start conditions, there is still a need for developing emission gas treatment system(s) with improved capacity to manage CO, HC, and $NO_x$ emissions at low engine exhaust temperatures.

The present disclosure generally provides a system and related methods for abatement of pollutants in an exhaust gas stream of a gasoline engine, the system comprising a catalyst article and a source of hydrogen gas ($H_2$). The system is configured to introduce $H_2$ from the $H_2$ source into the exhaust gas stream upstream of the catalyst article during a cold-start period, and is configured to provide a ratio by volume of CO to $H_2$ in the exhaust gas stream by modulating the $H_2$ introduction. Surprisingly, according to the present disclosure, it has been found that introducing a small amount of hydrogen gas ($H_2$) into the exhaust gas stream during the cold-start period can enhance TWC activity and minimize non-methane hydrocarbon and nitrogen oxide (NMHC+$NO_x$) emissions.

Accordingly, in one aspect, the disclosure provides a system for treating an exhaust gas stream from a gasoline engine, the system comprising: a three-way conversion (TWC) catalyst article downstream of and in fluid communication with the gasoline engine; a source of hydrogen gas ($H_2$); a feedback sensor located upstream from the TWC catalyst article and in contact with the exhaust gas stream; and a control unit in communication with the feedback sensor; wherein the system is configured to introduce $H_2$ from the $H_2$ source into the exhaust gas stream upstream of the TWC catalyst article during a cold-start period, and wherein the feedback sensor is configured to provide $H_2$ in the exhaust gas stream by modulating the $H_2$ introduction.

In one embodiment, the TWC catalyst article comprises a substrate, a first catalyst layer disposed on the substrate, and a second catalyst layer disposed on the first catalyst layer, wherein the first catalyst layer comprises a first palladium component, a first refractory metal oxide support, a first oxygen storage component, wherein at least a portion of the first palladium component is impregnated on the first refractory metal oxide support, and another portion of the first palladium component is impregnated on the first oxygen storage component; and the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support.

In one embodiment, the feedback sensor comprises a wide-band oxygen sensor (UEGO) and a temperature sensor.

In one embodiment, the source of $H_2$ is an on-board compressed hydrogen vessel.

In one embodiment, the source of $H_2$ is an on-board hydrogen generator. In one embodiment, the on-board hydrogen generator comprises an alcohol reformer, an ammonia decomposition apparatus, an electrolysis apparatus, a fuel reformer, an exhaust gas reformer, or a combination thereof. In one embodiment, the on-board hydrogen generator is an exhaust gas reformer comprising a catalytic reforming article located upstream from the catalytic article and in fluid communication with the exhaust gas stream. In one embodiment, the on-board hydrogen generator comprises at least one $H_2$ generating component comprising a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof, and wherein the at least one $H_2$ generating component is added to a gasoline fuel prior to combustion of said fuel in the gasoline engine.

In one embodiment, the system further comprises a $H_2$ injection article upstream from the TWC catalyst article, upstream from the feedback sensor, in fluid communication with the exhaust gas stream and with the $H_2$ source, and in communication with the control unit; the $H_2$ injection article configured to introduce $H_2$ from the $H_2$ source into the exhaust gas stream upstream of the catalyst article.

In one embodiment, the system is configured to introduce $H_2$ into the exhaust gas stream when the exhaust gas stream temperature upstream of or within the TWC catalytic article is in a range from about 90° C. to about 190° C.

In one embodiment, when a temperature of the exhaust gas stream upstream of or within the TWC catalytic article is in a range from about 90° C. to about 550° C., the exhaust gas stream contains no greater than about 20 vol % of $H_2$. In one embodiment, the exhaust gas stream contains no greater than about 18 vol % of $H_2$. In one embodiment, the exhaust gas stream contains no greater than about 16 vol % of $H_2$. In one embodiment, the exhaust gas stream contains no greater than about 14 vol % of $H_2$. In one embodiment, the exhaust gas stream contains no greater than about 12 vol % of $H_2$. In one embodiment, the exhaust gas stream contains no greater than about 10 vol % of $H_2$. In one embodiment, the exhaust gas stream contains no greater than about 8 vol % of $H_2$. In one embodiment, the exhaust gas stream contains no greater than about 6 vol % of $H_2$. In one embodiment, the exhaust gas stream contains no greater than about 4 vol % of $H_2$. In one embodiment, the exhaust gas stream contains no greater than about 2 vol % of $H_2$. In one embodiment, the exhaust gas stream contains no greater than about 1 vol % of $H_2$. In one embodiment, the exhaust gas stream contains no greater than about 0.5 vol % of $H_2$.

In one embodiment, the system is configured to introduce $H_2$ into the exhaust gas stream to provide a $\Delta\lambda$ value no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

In one embodiment, $\Delta\lambda$ is from about −0.014 to about −0.345. In one embodiment, $\Delta\lambda$ is about −0.060. In one embodiment, $\Delta\lambda$ is about −0.014.

In another aspect is provided a method of treating an exhaust gas stream from a gasoline engine, the method comprising: contacting the exhaust gas stream with a TWC catalyst article located downstream of the gasoline engine and in fluid communication with the exhaust gas stream; introducing hydrogen gas ($H_2$) from a $H_2$ source into the exhaust gas stream upstream of the TWC catalyst article; and controlling a concentration by volume of $H_2$ in the exhaust gas stream from the TWC catalyst article, wherein controlling the concentration by volume of $H_2$ comprises modulating the $H_2$ introduction.

In one embodiment, the TWC catalyst article comprises a substrate, a first catalyst layer disposed on the substrate, and a second catalyst layer disposed on the first catalyst layer, wherein: the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support.

In one embodiment, controlling a concentration by volume of $H_2$ comprises introducing $H_2$ into the exhaust gas stream when a temperature of the exhaust gas stream upstream from or inside the TWC catalyst article is in a range from about 90° C. to about 550° C. In one embodiment, controlling a concentration by volume of $H_2$ comprises introducing $H_2$ into the exhaust gas stream when a temperature of the exhaust gas stream upstream from or inside the TWC catalyst article is in a range from about 90° C. to about 190° C. In one embodiment, the $H_2$ is introduced for about 200 seconds.

In one embodiment, modulating the $H_2$ introduction comprises: obtaining a signal from a feedback sensor and/or a temperature sensor, the feedback sensor located upstream from the TWC catalyst article, and the temperature sensor located upstream from or inside the TWC catalyst article, both sensors in contact with the exhaust gas stream; and controlling a quantity of $H_2$ introduced using said signal.

In one embodiment, the exhaust gas stream contains no greater than about 20 vol % of $H_2$. In one embodiment, the exhaust gas stream contains no greater than about 18 vol % of $H_2$. In one embodiment, the exhaust gas stream contains no greater than about 16 vol % of $H_2$. In one embodiment, the exhaust gas stream contains no greater than about 14 vol % of $H_2$. In one embodiment, the exhaust gas stream contains no greater than about 12 vol % of $H_2$. In one embodiment, the exhaust gas stream contains no greater than about 10 vol % of $H_2$. In one embodiment, the exhaust gas stream contains no greater than about 8 vol % of $H_2$. In one embodiment, the exhaust gas stream contains no greater than about 6 vol % of $H_2$. In one embodiment, the exhaust gas stream contains no greater than about 4 vol % of $H_2$. In one embodiment, the exhaust gas stream contains no greater than about 2 vol % of $H_2$. In one embodiment, the exhaust gas stream contains no greater than about 1 vol % of $H_2$. In one embodiment, the exhaust gas stream contains no greater than about 0.5 vol % of $H_2$.

In one embodiment, the method comprises: introducing $H_2$ into the exhaust gas stream; and providing a $\Delta\lambda$ value no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

In one embodiment, $\Delta\lambda$ is from about −0.014 to about −0.345. In one embodiment, $\Delta\lambda$ is about −0.060. In one embodiment, $\Delta\lambda$ is about −0.014.

In one embodiment, introducing $H_2$ further comprises generating $H_2$ during the combustion of gasoline in the gasoline engine, wherein generating $H_2$ comprises adding at least one $H_2$ generating component to the gasoline prior to combustion.

In one embodiment, the at least one $H_2$ generating component comprises a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof.

In one embodiment, the method further comprises a vehicle comprising the gasoline engine and the TWC catalyst article. In one embodiment, the at least one $H_2$ generating component is added to the gasoline on board the vehicle. In one embodiment, the at least one $H_2$ generating component is added to the gasoline externally to the vehicle.

In one embodiment, introducing $H_2$ further comprises generating $H_2$, wherein generating $H_2$ comprises contacting the exhaust gas stream with an exhaust gas reforming catalyst.

In another aspect is provided a method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system as described herein.

These and other features and aspects of the disclosure will be apparent from the following detailed description together with the accompanying drawings, which are briefly described below. The present disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise. Other aspects and features of the present disclosure will become apparent from the following.

BRIEF DESCRIPTION OF THE DRAWINGS

In order to provide an understanding of embodiments of the present disclosure, reference is made to the appended drawings in which reference numerals refer to components of exemplary embodiments of the disclosure. The drawings are exemplary only, and should not be construed as limiting the disclosure. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

Figure 1:
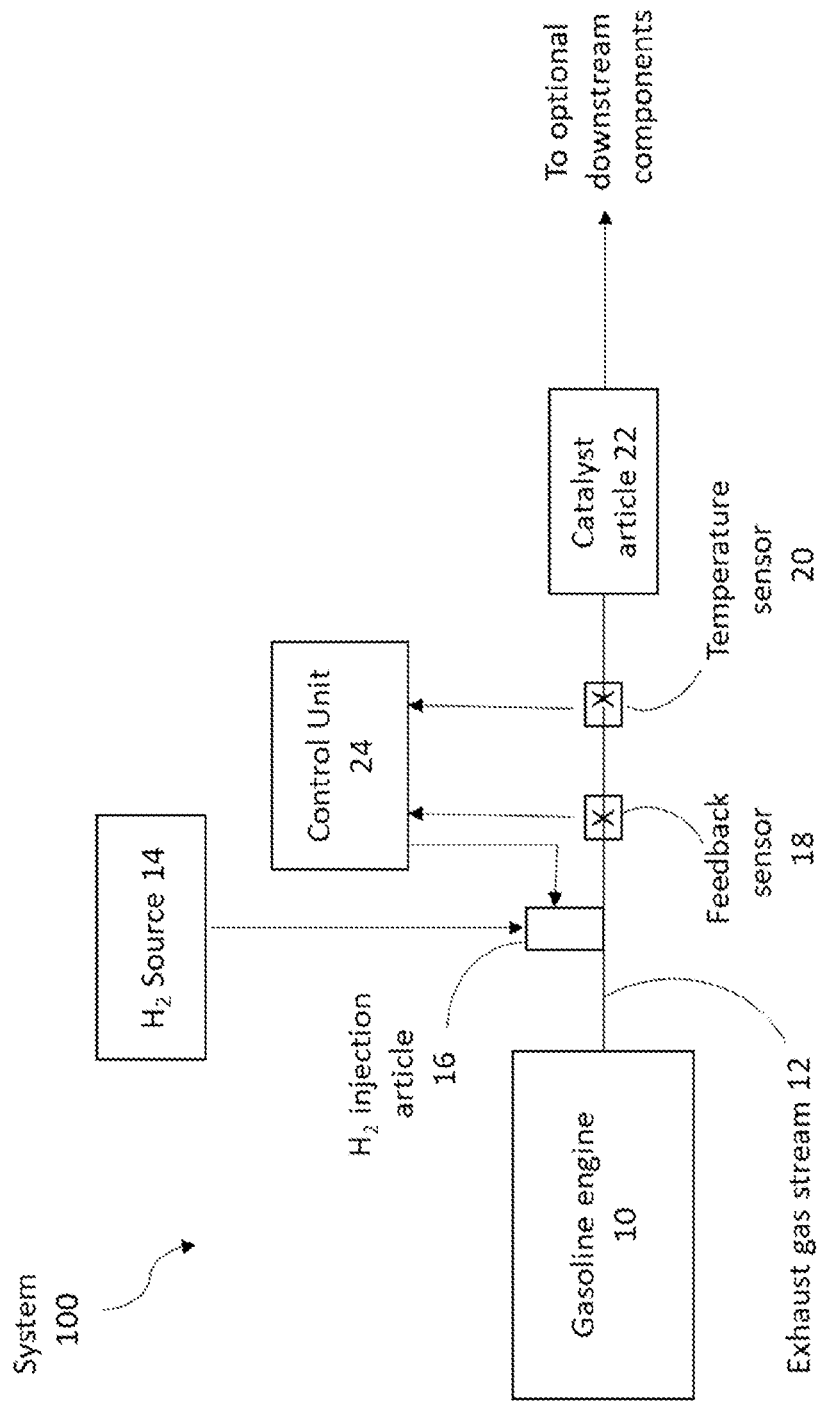
FIG. 1 is a schematic depiction of an embodiment of an emission treatment system in accordance with the present disclosure.
Figure 2:
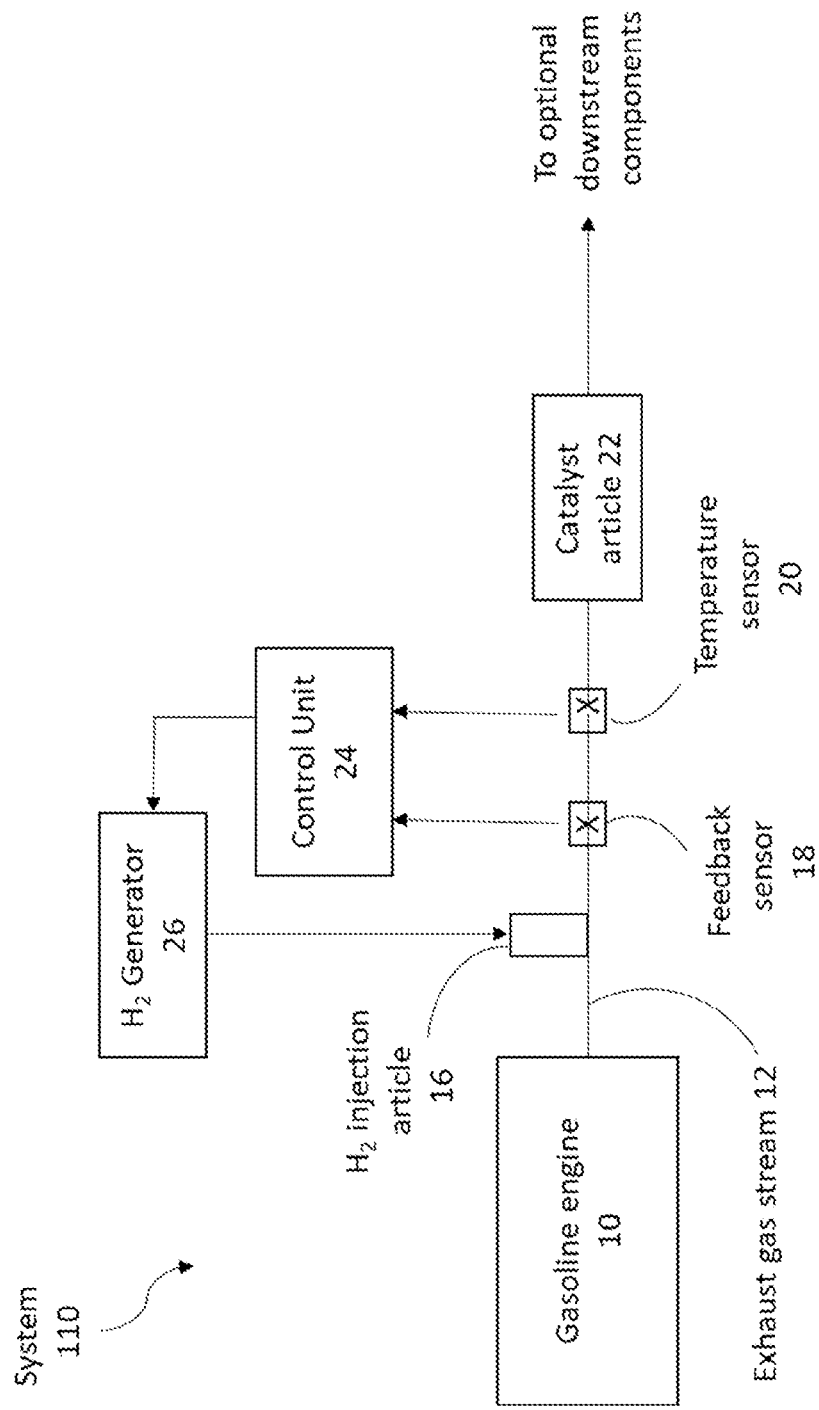
FIG. 2 is a schematic depiction of another embodiment of an emission treatment system in accordance with the present disclosure.
Figure 3:
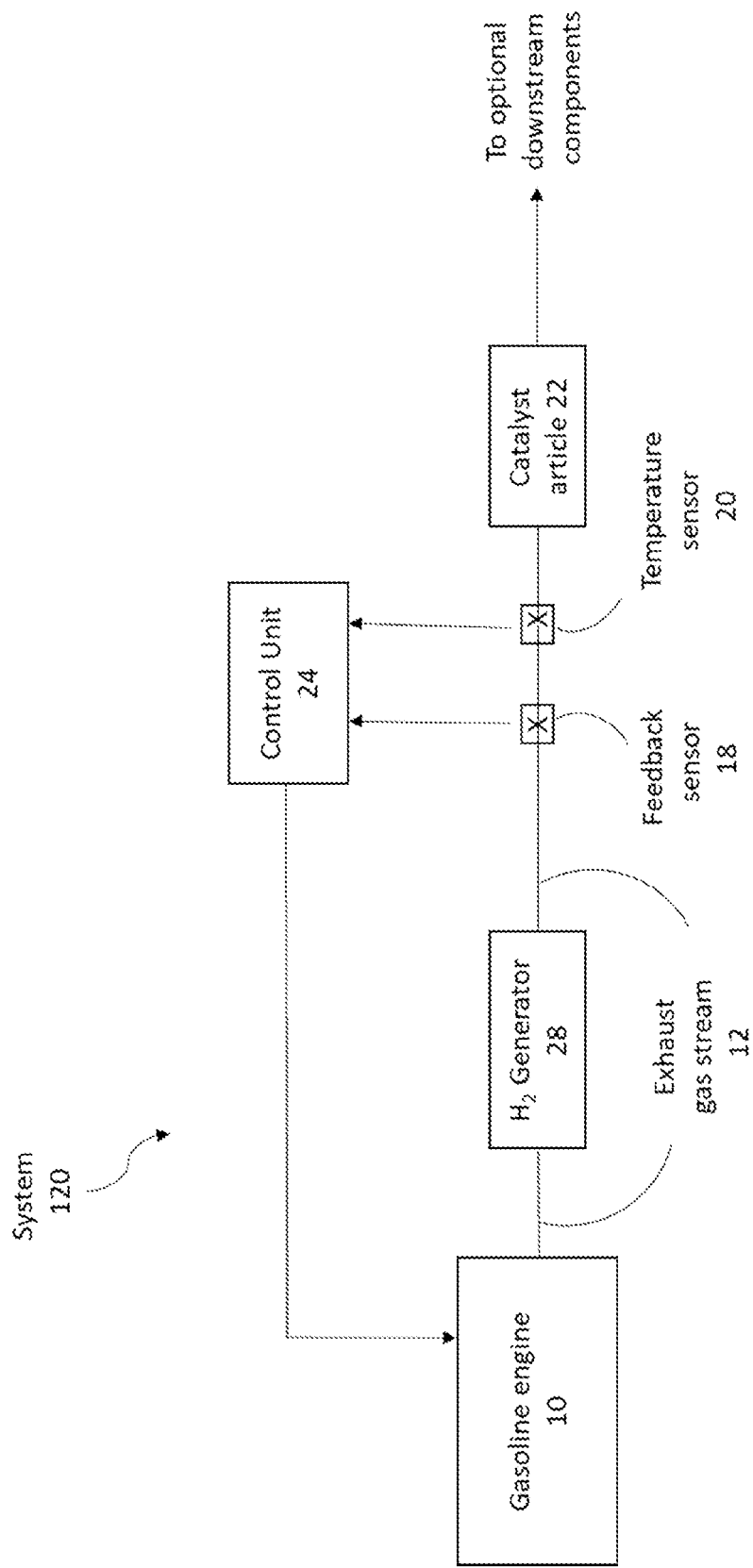
FIG. 3 is a schematic depiction of yet another embodiment of an emission treatment system in accordance with the present disclosure.
Figure 4:
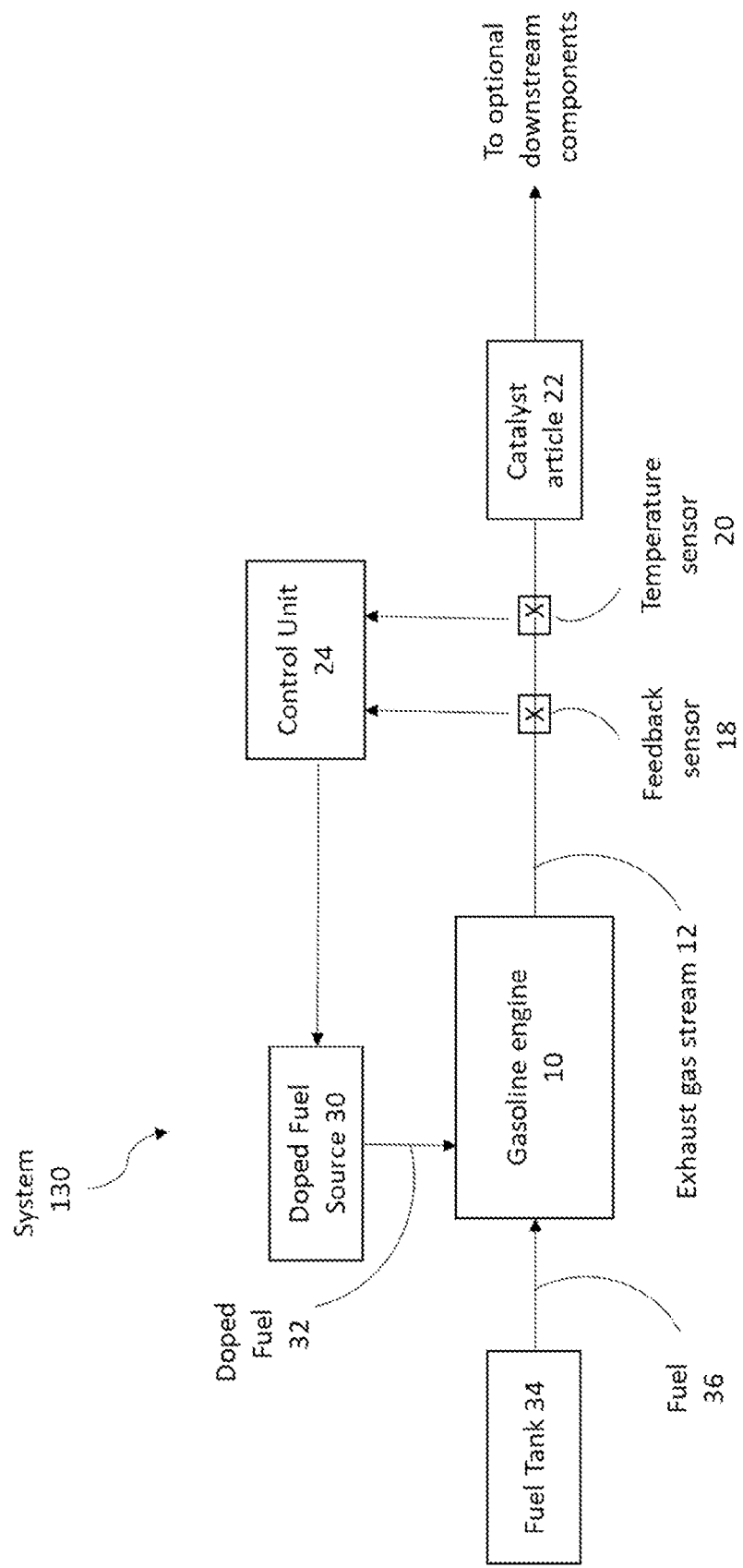
FIG. 4 is a schematic depiction of a further embodiment of an emission treatment system in accordance with the present disclosure.
Figure 5:
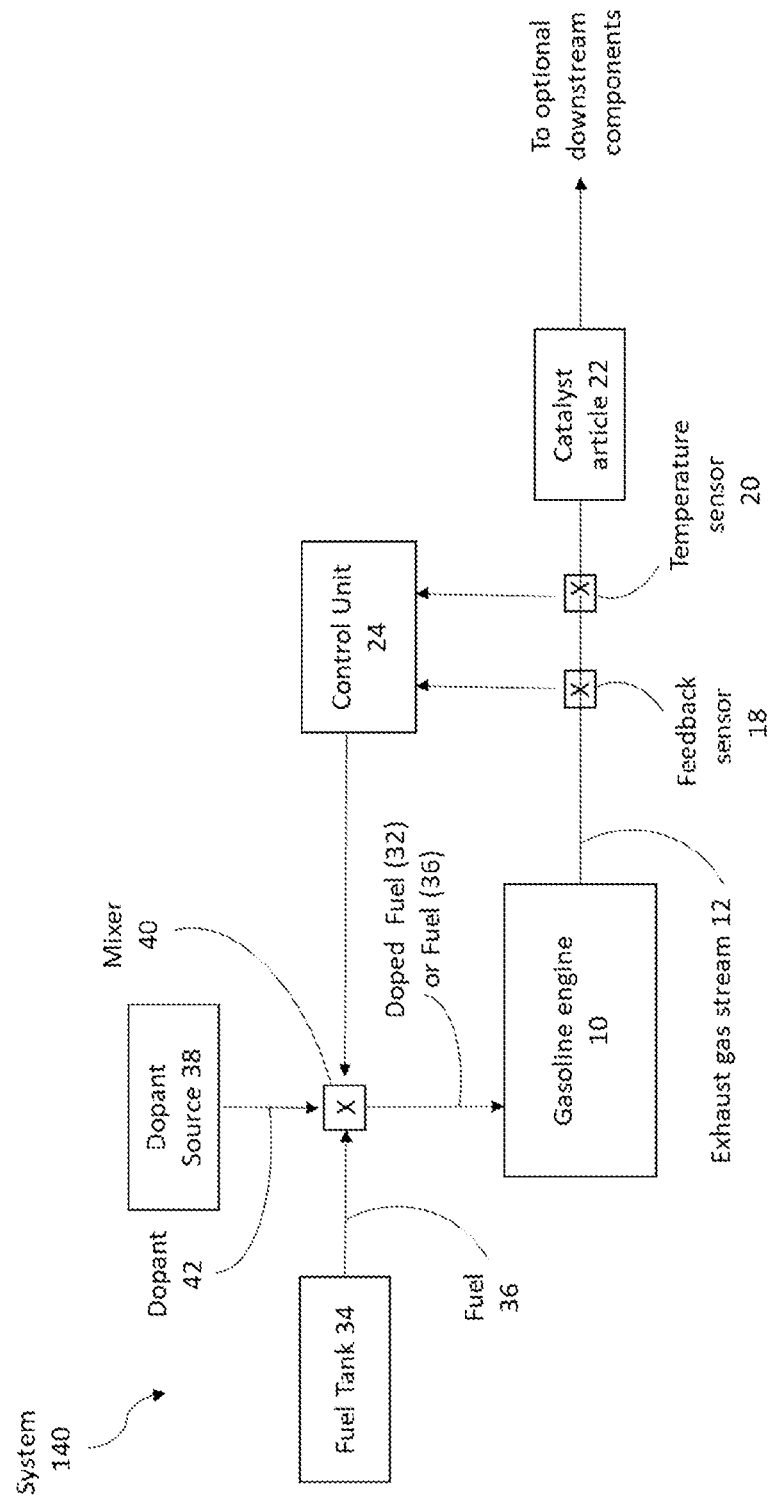
FIG. 5 is a schematic depiction of a still further embodiment of an emission treatment system in accordance with the present disclosure.

The present disclosure generally provides a system for abatement of pollutants in an exhaust gas stream of a gasoline engine along with related methods. The system comprises a catalyst article (for example, a three-way conversion (TWC) catalyst) and a source of hydrogen gas ($H_2$). The system is configured to introduce $H_2$ from the $H_2$ source into the exhaust gas stream upstream of the catalyst article during a cold-start period, and is configured to provide a ratio by volume of CO to $H_2$ in the exhaust gas stream by modulating the $H_2$ introduction. Surprisingly, according to the present disclosure, it has been found that introducing a small amount of hydrogen gas ($H_2$) into the exhaust gas stream during the cold-start period can enhance downstream catalyst (e.g., TWC) activity, and minimize non-methane hydrocarbon and nitrogen oxide (NMHC+$NO_x$) emissions.

Before describing several exemplary embodiments of the present disclosure, it is to be understood that the disclosure is not limited to the details of construction or process steps set forth in the following description. The disclosure is capable of other embodiments and of being practiced or being carried out in various ways.

With respect to the terms used in this disclosure, the following definitions are provided.

The articles "a" and "an" are used herein to refer to one or to more than one (i.e., to at least one) of the grammatical object of the article.

The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The terms "catalyst" or "catalyst material" or "catalyst composition" or "catalytic material" refer to materials that promote a reaction. To produce catalytic articles, a substrate as disclosed herein below is coated with a catalyst composition. The coatings are "catalytic coating compositions" or "catalytic coatings." The terms "catalyst composition" and "catalytic coating composition" are synonymous.

The term "catalytic article" in the present disclosure means an article comprising a substrate having a catalyst coating composition. In the present systems, an exhaust gas stream is passed through the catalytic article by entering the upstream end and exiting the downstream end. The inlet end of a catalytic article is synonymous with the "upstream" end or "front" end. The outlet end is synonymous with the "downstream" end or "rear" end.

The term "configured" as used in the description and claims is intended to be an open-ended term as are the terms "comprising" or "containing". The term "configured" is not meant to exclude other possible articles or elements. The term "configured" may be equivalent to "adapted".

Present systems comprise one or more "functional articles" or simply "articles". Functional articles comprise one or more certain functional elements, for instance reservoirs, tubing, pumps, valves, batteries, circuitry, meters, nozzles, reactors, filters, funnels, and the like. The systems are integrated, that is, having interconnected articles and/or elements.

The term "in fluid communication" is used to refer to articles positioned on the same exhaust line, i.e., a common exhaust stream passes through articles that are in fluid communication with each other. Articles in fluid communication may be adjacent to each other in the exhaust line.

As used herein, the phrase "molecular sieve" refers to framework materials such as zeolites and other framework materials (e.g., isomorphously substituted materials), which may, in particulate form, and in combination with one or more promoter metals, be used as catalysts. Molecular sieves are materials based on an extensive three-dimensional network of oxygen ions containing generally tetrahedral type sites and having a substantially uniform pore distribution, with the average pore size being no larger than about 20 Å.

Molecular sieves can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 Å to about 10 Å in diameter. CHA is an example of an "8-ring" molecular sieve having 8-ring pore openings and double-six ring secondary building units and having a cage like structure resulting from the connection of double six-ring building units by 4 ring connections. Molecular sieves comprise small pore, medium pore, and large pore molecular sieves or combinations thereof. The pore sizes are defined by the largest ring size.

The term "$NO_x$" refers to nitrogen oxide compounds, such as NO and $NO_2$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include rare earth oxides, such as ceria, lanthana, praseodymia, neodymia, niobia, europia, samaria, ytterbia, yttria, zirconia, and mixtures thereof in addition to ceria.

A platinum group metal (PGM) component refers to any component that includes a PGM (Ru, Rh, Os, Ir, Pd, Pt, and/or Au). For example, the PGM may be in metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

A "support" in a catalytic material or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below. "Refractory metal oxide supports" are metal oxides including, for example, bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia-alumina, and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina. Such materials are generally considered as providing durability to the resulting catalyst.

"High surface area refractory metal oxide supports" refer specifically to support particles generally exhibiting a BET surface area in excess of about 60 $m^2/g$, and often up to about 200 $m^2/g$ or higher, for example, up to about 350 $m^2/g$. "BET surface area" has its usual meaning of referring to the Brunauer-Emmett-Teller method for determining surface area by $N_2$ adsorption measurements. Unless otherwise stated, "surface area" refers to BET surface area. In some embodiments, the high surface area support material has a surface area of at least about 90 $m^2/g$, such as from about 90 $m^2/g$ to about 200 $m^2/g$, or from about 90 $m^2/g$ to about 150 $m^2/g$. Suitable high surface area refractory metal oxide supports include, but are not limited to, activated alumina.

Such activated alumina is usually a mixture of the gamma and delta phases of alumina, but may also contain substantial amounts of eta, kappa, and theta alumina phases.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., about 30% to about 90% by weight) of catalyst in a liquid, which is then coated onto a substrate and dried to provide a washcoat layer. Reference to "monolithic substrate" means a unitary structure that is homogeneous and continuous from inlet to outlet.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 Å to about 10 Å in diameter. Generally, zeolites have an open 3-dimensional framework structure composed of corner-sharing $TO_4$ tetrahedra, where T is Al or Si, or optionally P. The $SiO_4/AlO_4$ tetrahedra are linked by common oxygen atoms to form a three-dimensional network. Cations that balance the charge of the anionic framework are loosely associated with the framework oxygens, and the remaining pore volume is filled with water molecules. The non-framework cations are generally exchangeable, and the water molecules removable.

In specific embodiments, reference may be made to an "aluminosilicate zeolite" framework type, which limits the material to zeolites that do not include phosphorus or other metals substituted in the framework, while the broader term "zeolite" is intended to include aluminosilicates and aluminophosphates. In some embodiments, the zeolite is an aluminosilicate zeolite. The term "aluminophosphates" refers to another specific example of a zeolite, including aluminum and phosphate atoms. Aluminophosphates are crystalline materials having rather uniform pore sizes. In some embodiments, the zeolite is a silicoaluminophosphate. Silicoaluminophosphate zeolites comprise $SiO_4/AlO_4/PO_4$ tetrahedra, and are referred to as "SAPOs." Non-limiting examples of SAPOs include SAPO-34 and SAPO-44.

Zeolites generally comprise silica to alumina (SAR) molar ratios of about 2 or greater. Zeolites for use in the disclosed catalyst compositions are not particularly limited in terms of SAR values, although the particular SAR value associated with a zeolite may, in some embodiments, affect the performance of the catalyst composition into which it is incorporated (e.g., after aging). In some embodiments, the SAR values of the zeolites are in the range of from about 2 to about 300, including about 5 to about 250, about 5 to about 200, about 5 to about 100, and about 5 to about 50.

Zeolites can be classified by means of the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications, and patents referred to herein are hereby incorporated by reference.

I. Exhaust Gas Treatment System

The exhaust gas treatment systems as disclosed herein generally comprise a catalyst article, a source of hydrogen gas ($H_2$), a control unit, and a feedback sensor. Each system component is further described herein below.

Catalyst Article

Exhaust gas treatment systems as disclosed herein comprise a catalyst article, for example, a three-way conversion (TWC) catalyst article, a four-way conversion catalyst article, a selective catalytic reduction (SCR) catalyst article, a direct oxidation catalyst article, an ammonia oxidation (AMOx) catalyst article, a catalyzed soot filter (CSF) article, or a combination thereof. Such articles comprise a substrate on which is disposed an appropriate catalyst composition. Each catalyst composition, and suitable substrates, are described further herein below.

Three-Way Conversion (TWC) Catalysts

In some embodiments, the catalyst article as disclosed herein is a TWC catalyst article comprising a TWC composition. As used herein, TWC catalysts refer to any catalyst composition known in the art for the conversion of HC, CO, and/or $NO_x$. TWC catalysts typically contain platinum group metal (PGM) components, such as, for example platinum (Pt), palladium (Pd), and rhodium (Rh), impregnated onto a porous support material. Pt and Pd are generally used for HC and CO conversion, while Rh is more effective for the reduction of NO$_x$. The concentration of the PGM components (e.g., Pd, Pt, and Rh) can vary, but will typically be from about 0.1 wt % to about 10 wt % relative to the weight of the impregnated porous support material. Optionally, a TWC catalyst may include an oxygen storage component (OSC) as described herein above. A TWC catalyst typically further comprises a metal oxide such as barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, and combinations thereof. The amount of metal oxide can vary, but will typically be from about 1 wt % to about 20 wt %.

In some embodiments, the TWC catalyst article comprises a substrate, a first catalyst layer disposed on the substrate, and a second catalyst layer disposed on the first catalyst layer, wherein: the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support.

Four-Way Catalyst

In some embodiments, the catalyst article as disclosed herein is a four-way catalyst article. Such articles comprise a TWC catalyst article as described herein above, and further comprise a filter.

Selective Catalytic Reduction (SCR) Catalyst

In some embodiments, the catalyst article as disclosed herein is an SCR catalyst. Any SCR catalyst known in the art may be used, such as those comprising a mixed metal oxide component or a metal-promoted zeolite. The term "mixed metal oxide component" refers to an oxide that contains cations of more than one chemical element or cations of a single element in several states of oxidation. In one or more embodiments, the mixed metal oxide is selected from $Fe_2O_3/TiO_2$, $Fe_2O_3/Al_2O_3$, $MgO/TiO_2$, $MgO/Al_2O_3$, $MnO/Al_2O_3$, $MnO/TiO_2$, $CuO/TiO_2$, $CeO_2/ZrO_2$, $TiO_2/ZrO_2$, $V_2O_5/TiO_2$, $V_2O_5/TiO_2/SiO_2$, and mixtures thereof. The mixed oxide can be a single phase chemical compound or a multi-phase physical or chemical mixture.

In other embodiments, the SCR catalyst comprises a metal-promoted zeolite. The term "promoted" generally refers to a zeolite as described herein comprising one or more components that are intentionally added, as opposed to comprising impurities that may be inherent in the zeolite. Thus, a promoter is a component that is intentionally added to enhance the activity of a catalyst, compared to a catalyst that does not have promoter intentionally added. In order to promote the SCR catalysts of oxides of nitrogen, in one or more embodiments according to the present disclosure, a suitable metal is exchanged into a zeolite.

Suitable zeolites may be small pore, medium pore, or large pore zeolites.

A small pore zeolite contains channels defined by up to eight tetrahedral atoms. As used herein, the term "small pore" refers to pore openings which are smaller than about 5 Angstroms, for example on the order of about 3.8 Angstroms. Example small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof. In some embodiments, the zeolite is a small pore zeolite.

A medium pore zeolite contains channels defined by ten-membered rings. Example medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof.

A large pore zeolite contains channels defined by twelve-membered rings. Example large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

In one or more embodiments, the zeolite is a small-pore, 8-ring zeolite having a pore structure and a maximum ring size of eight tetrahedral atoms. In other embodiments, the small pore zeolite comprises a d6r unit. Thus, in one or more embodiments, the small pore zeolite has a structure type selected from AEI, AFT, AFX, CHA, EAB, ERI, KFI, LEV, LTN, MSO, SAS, SAT, SAV, SFW, TSC, and combinations thereof. In some embodiments, the zeolite has a structure type selected from CHA, AEI, AFX, ERI, KFI, LEV, and combinations thereof. In some embodiments, the small pore zeolite has a structure type selected from CHA, AEI, and AFX. In one or more embodiments, the small pore zeolite has the CHA structure type. Zeolites having the CHA structure that are useful in the present disclosure include, but are not limited to SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6. In some embodiments, the zeolite having the CHA crystal structure is an aluminosilicate zeolite. In some embodiments, the aluminosilicate zeolite is SSZ-13.

Promoter metals can generally be selected from alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Accordingly, the zeolite of one or more embodiments may be ion-exchanged with one or more metals selected from alkali metals, alkaline earth metals, transition metals in Groups IIIB, IVB, VB, VIB VIIB, VIIIB, IB, and IIB, Group IIIA elements, Group IVA elements, lanthanides, actinides, and a combination thereof. In further embodiments, the zeolite of one or more embodiments may be ion-exchanged with one or more promoter metals such as copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In some embodiments, the promoter metal is copper, iron, or a combination thereof.

The concentration of promoter metal present in the metal ion-exchanged zeolite can vary, but will typically be from about 0.1 wt. % to about 20 wt. % relative to the weight of the ion-exchanged zeolite, calculated as metal oxide. In one or more embodiments, the promoter metal is present in an amount in the range of about 0.1% to about 10% by weight, based on the total weight of the ion-exchanged zeolite. In one or more embodiments, the promoter metal comprises Cu, and the Cu content, calculated as CuO is in the range of up to about 10 wt. %, including about 9 wt. %, about 8 wt. %, about 7 wt. %, about 6 wt. %, about 5 wt. %, about 4 wt. %, about 3 wt. %, about 2 wt. %, about 1 wt. %, about 0.5 wt. %, and about 0.1 wt. %, on an oxide basis, in each case based on the total weight of the calcined ion-exchanged zeolite and reported on a volatile free basis. In some embodiments, the copper-promoted zeolite has the CHA framework structure.

In one or more embodiments, the promoter metal comprises Fe, and the Fe content, calculated as $Fe_2O_3$ is in the range of up to about 10 wt. %, including about 9 wt. %, about 8 wt. %, about 7 wt. %, about 6 wt. %, about 5 wt. %, about 4 wt. %, about 3 wt. %, about 2 wt. %, about 1 wt. %, about 0.5 wt. %, and about 0.1 wt. %, on an oxide basis, in each case based on the total weight of the calcined ion-exchanged zeolite and reported on a volatile free basis. In some embodiments, the iron-promoted zeolite has the CHA framework structure.

Any optional additional metal can be selected from alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof.

For additional suitable SCR catalyst, see, for example, U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; and U.S. Pat. No. 7,220,692 to Marshall et al., which are all incorporated by reference herein in their entireties.

Direct Oxidation Catalyst

In some embodiments, the catalyst article as disclosed herein is an oxidation catalyst which converts hydrocarbons and carbon monoxide to $CO_2$ and water. Any suitable oxidation catalyst known in the art may be used. Typically, an oxidation catalyst comprises one or more PGMs such as palladium and/or platinum; a support material such as alumina; zeolites for hydrocarbon storage; and optionally promoters and/or stabilizers.

Ammonia Oxidation (AMOx) Catalyst

In some embodiments, the catalyst article as disclosed herein is an AMOx catalyst. "AMOx" catalyst refers to a catalyst that promotes the selective oxidation of ammonia to nitrogen. Generally, an AMOx catalyst may be provided downstream of an SCR catalyst to remove any slipped ammonia from an exhaust gas treatment system comprising an SCR catalyst. An AMOx catalyst generally contains one or more metals (typically a PGM such as platinum, palladium, rhodium, or combinations thereof) suitable to convert ammonia to nitrogen. The one or more metals is supported on a material such as a refractory metal support.

Catalyzed Soot Filter (CSF)

In some embodiments, the catalyst article as disclosed herein is a CSF. A CSF provides soot filtration and regeneration, and may carry oxidation catalysts to oxidize CO and HC to $CO_2$ and $H_2O$, or to oxidize NO to $NO_2$ to accelerate a downstream SCR catalyst, or to facilitate the oxidation of soot particles at lower temperatures. The CSF substrate is in the form of a wall-flow filter, as described herein below.

Substrate

The catalyst articles described herein comprise a catalyst composition (e.g., a TWC catalyst, SCR catalyst, AMOx catalyst, or oxidation catalyst composition) disposed on a substrate. Useful substrates are 3-dimensional, having a length and a diameter and a volume, similar to a cylinder. The shape does not necessarily have to conform to a cylinder. The length is an axial length defined by an inlet end and an outlet end.

The substrate may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Substrates may also be metallic, comprising one or more metals or metal alloys. A metallic substrate may include any metallic substrate, such as those with openings or "punch-outs" in the channel walls. The metallic substrates may be employed in various shapes, such as pellets, compressed metallic fibers, corrugated sheet or monolithic foam. Specific examples of metallic substrates include heat-resistant, base-metal alloys, such as those in which iron is a substantial or major component. Such alloys may contain one or more of nickel, chromium, and aluminum, and the total of these metals may comprise at least about 15 wt % (weight percent) of the alloy, for instance, about 10 wt % to about 25 wt % chromium, about 1 wt % to about 8 wt. % of aluminum, and from 0 wt % to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type having a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety. In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate.

Source of Hydrogen Gas ($H_2$)

The exhaust gas treatment system as disclosed herein comprises a source of hydrogen gas ($H_2$). In some embodiments, the source of $H_2$ is an on-board storage vessel, such as a compressed $H_2$ tank. Hydrogen may be stored in a gaseous, liquid, or solid state. Hydrogen may be stored for instance in a solid state, for example in silicon or a hydrogen storage alloy. Solid state hydrogen storage is taught for example in US Patent Application Publication Nos. 2004/0241507, 2008/0003470, 2008/0274873, 2010/0024542 and 2011/0236790, each of which is incorporated by reference herein in their entirety. Hydrogen storage alloys reversibly store hydrogen and are disclosed for example in U.S. Pat. Nos. 5,407,761 and 6,193,929, and US Patent Application Publication No. 2016/0230255, each of which is incorporated by reference herein in their entirety. Hydrogen storage alloys are for example modified $AB_x$ type metal hydride (MH) alloys where in general, A is a hydride forming element and B is a weak or non-hydride forming element. A is, in general, a larger metallic atom with 4 or less valence electrons and B is, in general, a smaller metallic atom with 5 or more valence electrons. Suitable $AB_x$ alloys include those where x is from about 0.5 to about 5. The present alloys are capable of reversibly absorbing (charging) and desorbing (discharging) hydrogen. $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$), and $AB_5$ ($LaNi_5$, $CeNi_5$).

In other embodiments, the source of $H_2$ is an on-board $H_2$ generator. In such embodiments, exhaust gas treatment system comprises or is associated with an on-board $H_2$ generator which may comprise an alcohol reformer, an ammonia decomposition apparatus, an electrolysis apparatus, a fuel reformer, an exhaust gas reformer, or a combination thereof. In such embodiments, the $H_2$ may be generated on demand, or generated and subsequently stored, e.g., in an on-board storage vessel.

In some embodiments, the on-board $H_2$ generator comprises a water-splitting article or an ammonia decomposition article configured to generate hydrogen. The water-splitting article may comprise an electrolytic cell configured to split water into hydrogen and oxygen via an electrochemical reaction. For instance, the water-splitting article may comprise a photoelectrode configured to initiate the electrochemical reaction. A photoelectrode is associated with a light source. In some embodiments, the light source is a light emitting diode (LED), for example a blue light emitting diode. The light source may be associated with a battery. The battery is, for example, the main rechargeable vehicle battery. Devices for hydrogen generation are disclosed, for example, in US Patent Application Publication Nos. 2007/0246351 and 2008/0257751, each of which is incorporated by reference herein in their entirety.

In some embodiments, the on-board hydrogen generator may comprise a catalytic article ("catalytic reactor") configured to decompose ammonia into nitrogen and hydrogen (ammonia decomposition article). The source of ammonia may be from an on-board ammonia reservoir or may be from ammonia brought on-board, for example in a tank adapted to contain gaseous or liquid ammonia (and adapted to release ammonia as needed). For instance, the system may comprise a tank adapted to contain ammonia and release ammonia (ammonia storage tank) and a catalytic reactor configured to decompose ammonia into hydrogen and nitrogen. For example, the system may comprise an ammonia generation system and a catalytic reactor configured to decompose ammonia to hydrogen and nitrogen. Suitable systems for generating and storing hydrogen are disclosed in, for example, US Patent Application Publication Nos. 2020/0102871, 2020/0032689, 2020/0032688, and 2020/0032686; and in International Patent Application Publication Nos. WO2018185665 and WO2018185655, all to BASF Corp., and each of which is incorporated by reference herein in its entirety.

In some embodiments, the on-board hydrogen generator may comprise a catalytic article ("catalytic reformer") configured to decompose hot exhaust gas components (e.g., unburned hydrocarbon fuel) into carbon monoxide and hydrogen via oxidation over certain metal oxide catalysts. In such embodiments, the catalytic reformer is located upstream from the catalytic article (e.g., TWC) and in fluid communication with the exhaust gas stream.

In some embodiments, the on-board hydrogen generator comprises at least one $H_2$ generating component comprising a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof, and wherein the at least one $H_2$ generating component added to a gasoline fuel prior to combustion of said fuel in the gasoline engine.

Such nanoparticles, when mixed with fuel and subjected to combustion in the combustion chamber of a gasoline internal combustion engine, produce hydrogen in excess of the normal small amounts produced in the absence of such particles. In some embodiments, the at least one $H_2$ generating component is added to the gasoline on board the vehicle. In some embodiments, the at least one $H_2$ generating component is added to the gasoline externally to the vehicle.

$H_2$ Injection Article

In some embodiments, the exhaust gas treatment system as disclosed herein comprises a $H_2$ injection article, for instance a valve, in fluid communication with the $H_2$ source and configured to prevent the exhaust gas stream from entering the $H_2$ source, and configured to introduce $H_2$ into the exhaust gas stream. In some embodiments, $H_2$ may be "pulsed" or released intermittently into the exhaust gas stream to perform the desired reducing function upon demand (on-demand). The $H_2$ injection article is in fluid communication with the catalyst article and configured to introduce $H_2$ into the exhaust gas stream upstream of the catalyst article, for example a TWC catalyst article. The $H_2$ injection article will typically be downstream of and in fluid communication with an internal combustion engine, and in communication with one or more of a feedback sensor and a control unit. In some embodiments, the $H_2$ injection article is located upstream from a catalyst article, upstream from a feedback sensor, in fluid communication with an exhaust gas stream and with an $H_2$ source, and in communication with a control unit, and is configured to introduce $H_2$ from the $H_2$ source into the exhaust gas stream upstream of the catalyst article.

Feedback Sensor

The introduction (e.g., injection) of $H_2$ into the exhaust gas stream is controlled in order to keep the concentration of $H_2$ in the exhaust gas stream below the flammability limit. The concentration of $H_2$ can be controlled by monitoring the $H_2$ concentration in the exhaust gas stream and adjusting the introduction of $H_2$ accordingly (i.e., modulating the $H_2$ introduction), for example, direct measurement via an appropriate method, such as mass-spectrometry, previously determined pre-set values, or by surrogate measures using a sensor. Although direct measurement using mass-spectrometry is well-established, its use on-board of a passenger vehicle is impractical due to additional space requirements, high-cost of the system, increased noise level, complexity in servicing, etc. The utilization of pre-set values would be based on calculating desired $H_2$ flow based on a previously measured set of parameters (concentration of different species, flow rate, etc.). This requires that vehicle operates exactly the same way every time, and may prove inaccurate under many circumstances (difference in external temperature, air humidity, age of the engine, etc.). Typically, the simplest, most cost effective and reliable method is the use of a sensor.

Accordingly, in some embodiments, the exhaust gas treatment system as disclosed herein comprises a feedback sensor. The feedback sensor may be an oxygen sensor, such as a wide-band oxygen sensor (UEGO). The use of an $O_2$ sensor (for example, wide-band UEGO) has proven to be a reliable method to approximate the sum composition of exhaust gas with respect to its oxidative (lean mixture) and reductive (rich mixture) nature. The injection of $H_2$ into the exhaust will directly influence the reading of an $O_2$-sensor, generating a rich shift ($\lambda<1$). Several well-established formulae (see, for example, Brettschneider, J. (1997), SAE Technical Papers 972989) can be used to calculate the air-to-fuel ratio ($\lambda$) for a given exhaust gas composition. Therefore, one can easily correlate the concentration of oxidants and reductants (specifically $H_2$) in the exhaust to the reading of the $O_2$-sensor.

In some embodiments, the exhaust gas treatment system further comprises a temperature sensor for detecting a temperature of the exhaust gas stream, for example, a thermocouple, located upstream from the catalytic article and in contact with the exhaust gas stream, located within the catalytic article and in contact with the exhaust gas stream, or both.

In some embodiments, the feedback sensor and/or the temperature sensor are in communication with a control unit. In such embodiments, a signal from the feedback sensor, the temperature sensor, or both, are fed to the control unit in order to modulate the introduction of $H_2$ into the exhaust gas stream.

Control Unit

The exhaust gas treatment system may be integrated into the engine electronic management algorithm (electronic management system or electronic control unit (ECU)). For example, the feedback sensor and temperature sensor may provide a signal to the control unit, which then adjusts one or more of $H_2$ introduction, $H_2$ generation, and engine parameters such as air-to-fuel ratio. In some embodiments, the control unit communicates with (i.e., provides a signal to) the $H_2$ injection article, causing a valve to open or close, allowing $H_2$ introduction to start or stop, respectively.

The control unit continually or periodically monitors numerous parameters and performs numerous calculations. Some of these relate to the air-fuel ratio. For example, the vehicle manufacturer defines two control parameters: a pre-defined value of air-to-fuel ratio, designated $\lambda°$, and a running average air-to-fuel ratio, designated $\bar{\lambda}$. The former parameter ($\lambda°$) can be obtained, but is not limited to, through mathematical modelling, experimental measurements, auto-generated as a result of readings by the vehicle Electronic Control Unit (ECU), etc. The latter parameter ($\bar{\lambda}$), is calculated by dividing the sum of all air-to-fuel ratio measurements $\Sigma_{i=1}^{N}\lambda_i$ generated for a given length of time by the number of measurements (N) comprised in this length of time, according to the formula:

$$\bar{\lambda} = \frac{\sum_{i=1}^{N}\lambda_i}{N}$$

where $\lambda_i$ is the air-to-fuel ratio at each point. The difference between $\bar{\lambda}$ and $\lambda°$, is designated $\Delta\lambda$, and is calculated by the Control Unit, according to the formula shown below.

$$\Delta\lambda = \bar{\lambda} - \lambda°.$$

It is understood that, that for a typical gasoline engine, a $\Delta\lambda$ of about $-0.345$ corresponds to about 20% by volume of $H_2$ in the exhaust gas, a $\Delta\lambda$ of about $-0.060$ corresponds to about 2% by volume of $H_2$ in the exhaust gas, and a $\Delta\lambda$ of about $-0.014$ corresponds to about 0.5% by volume of $H_2$ in the exhaust gas. Accordingly, the $\Delta\lambda$ value can be calculated by the ECU using data from the feedback sensor, and used as a surrogate measure of $H_2$ concentration. Accordingly, the ECU may be used to modulate $H_2$ introduction to provide a specific concentration of $H_2$ in the exhaust gas stream.

The exhaust gas treatment system as disclosed herein may be appreciated by reference to FIGS. 1-5, which illustrate various non-limiting embodiments. With reference to FIG. 1, in one illustrative embodiment, the exhaust gas treatment system (100) comprises an internal combustion gasoline engine (10), producing an exhaust gas stream (12), a catalyst article (22), a feedback sensor (18), a control unit (24), and a $H_2$ source (14). System 100 further comprises a $H_2$ injection article (16) and a temperature sensor (20). The location of the temperature sensor 20 may vary, for example, it may be within the catalyst article 22, upstream of the catalyst article 22, or both. The catalyst article 22, for example a TWC catalyst article, is located downstream of and in fluid communication with the gasoline engine 10. The feedback sensor 18 is located upstream from the catalyst article 22 and in contact with the exhaust gas stream 12. The control unit 24 is in communication with the feedback sensor 18, the temperature sensor 20, and the $H_2$ injection article 16. The system is configured to introduce $H_2$ from the $H_2$ source 14 into the exhaust gas stream 12 upstream of the catalyst article 22 during a cold-start period. The feedback sensor 18 is configured to provide a concentration of $H_2$ in the exhaust gas stream 12 by modulating the $H_2$ introduction via the control unit 24 and the $H_2$ injection article 16.

In another illustrative embodiment (FIG. 2), the exhaust gas treatment system (110) comprises an internal combustion gasoline engine (10), producing an exhaust gas stream (12), a catalyst article (22), a feedback sensor (18), a control unit (24), and a $H_2$ generator (26). System 110 further comprises a $H_2$ injection article (16) and a temperature sensor (20). The location of the temperature sensor 20 may vary, for example, it may be within the catalyst article 22, upstream of the catalyst article 22, or both. The catalyst article 22, for example a TWC catalyst article, is located downstream of and in fluid communication with the gasoline engine 10. The feedback sensor 18 is located upstream from the catalyst article 22 and in contact with the exhaust gas stream 12. The control unit 24 is in communication with the feedback sensor 18, the temperature sensor 20, and the $H_2$ generator 26. The system is configured to introduce $H_2$ from the $H_2$ generator 26 into the exhaust gas stream 12 upstream of the catalyst article 22 during a cold-start period. The feedback sensor 18 is configured to provide a concentration of $H_2$ in the exhaust gas stream 12 by modulating the $H_2$ introduction via the control unit 24 and the $H_2$ generator 26.

In yet another illustrative embodiment (FIG. 3), the exhaust gas treatment system (120) comprises an internal combustion gasoline engine (10), producing an exhaust gas stream (12) comprising carbon monoxide (CO), a catalyst article (22), a feedback sensor (18), a temperature sensor (20) and a control unit (24). The location of the temperature sensor 20 may vary, for example, it may be within the catalyst article 22, upstream of the catalyst article 22, or both. System 120 further comprises a $H_2$ generator 28, located downstream of and in fluid communication with the gasoline engine 10. The catalyst article 22, for example a TWC catalyst article, is located downstream of and in fluid communication with the gasoline engine 10 and the $H_2$ generator 28. The feedback sensor 18 is located upstream from the catalyst article 22 and in contact with the exhaust gas stream 12, and downstream of the $H_2$ generator 28. The system is configured to introduce $H_2$ from the $H_2$ generator 28 into the exhaust gas stream 12 upstream of the catalyst article 22 during a cold-start period. The feedback sensor 18 is configured to provide a concentration of $H_2$ in the exhaust gas stream 12 by modulating the $H_2$ introduction via the control unit 24. The control unit 24 is in communication with the feedback sensor 18, the temperature sensor 20, and the gasoline engine 10. The $H_2$ generator 28 is a catalytic reformer which catalyzes an in situ process of generating additional hydrogen from the components of the exhaust gas, upon contacting exhaust gas with the catalytic reformer. The system is configured to introduce $H_2$ from the $H_2$ generator 28 into the exhaust gas stream 12 upstream of the catalyst article 22 during a cold-start period. Using a signal from the control unit (24), the gasoline engine (10) functions in a regime favoring the introduction (i.e., creation of) hydrogen in the exhaust gas stream. This can be achieved by, for example, having the gasoline engine (10) decrease the air-fuel ratio such that additional CO and/or HC are available for catalytic reformation to $H_2$ in generator (28).

In yet another illustrative embodiment (FIG. 4), the exhaust gas treatment system (130) comprises an internal combustion gasoline engine (10), producing an exhaust gas stream (12), a catalyst article (22), a feedback sensor (18), a temperature sensor (20), and a control unit (24). The location of the temperature sensor 20 may vary, for example, it may be within the catalyst article 22, upstream of the catalyst article 22, or both. System 130 further comprises a fuel tank (34), containing fuel (36) and a doped fuel source (30) containing doped fuel (32). The doped fuel source 30 provides doped fuel 32 to the internal combustion gasoline engine 10 to facilitate an in situ process of generating additional hydrogen upon combustion. The doped fuel 32 comprises fuel 36 and a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof. The doped fuel source 30 may comprise, for example, a storage vessel containing the doped fuel 32, and may further comprise such articles as valves, mixers, pumps, metering devices, and the like, and is configured to convey the doped fuel 32 to the gasoline engine 10. In such embodiments, the dopant is generally mixed with the fuel externally to the vehicle, prior to adding doped fuel 32 to the doped fuel source 30.

The control unit 24 is in communication with feedback sensor 18, temperature sensor 20, and the doped fuel source 30. The location of the temperature sensor 20 may vary, for example, it may be within the catalyst article 22, upstream of the catalyst article 22, or both. Using a signal from the control unit 24, the doped fuel source 30 introduces doped fuel 32 into the gasoline engine 10 prior to combustion during a cold-start period. The feedback sensor 18 is configured to provide a concentration of $H_2$ in the exhaust gas stream 12 by modulating the $H_2$ introduction via the control unit 24 and doped fuel source 30.

In yet another illustrative embodiment (FIG. 5), the exhaust gas treatment system (140) comprises an internal combustion gasoline engine (10), producing an exhaust gas stream (12), a catalyst article (22), a feedback sensor (18), a temperature sensor (20), and a control unit (24). The location of the temperature sensor 20 may vary, for example, it may be within the catalyst article 22, upstream of the catalyst article 22, or both. System 140 further comprises a fuel tank (34), containing fuel (36), a mixer (40), and a dopant source (38) containing a dopant (42) comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof. Such components, under combustion conditions, produce an exhaust gas stream enriched in $H_2$. The mixer 40 may comprise, for example, such articles as valves, pumps, metering devices, and the like, and is configured to convey the doped fuel 32 and/or fuel 36 to the gasoline engine 10.

The dopant source 38 provides dopant 42 to the internal combustion gasoline engine 10 by way of mixer 40 to facilitate an in situ process of generating additional hydrogen upon combustion. In this embodiment, the mixer 40 mixes fuel 36 with dopant 42, and provides the doped fuel 32 to gasoline engine 10 during a cold-start period. The mixer 40 delivers fuel 36 without dopant at other times (e.g., during normal operation). The feedback sensor 18 is configured to provide a concentration of $H_2$ in the exhaust gas stream 12 by modulating the $H_2$ introduction via the control unit 24, fuel 36, dopant 42, and mixer 40.

In each of the exhaust gas treatment system embodiments disclosed herein, the exhaust gas treatment system is configured to introduce the $H_2$ concentration in the exhaust gas stream 12, and to provide a concentration of $H_2$ in the exhaust gas stream. The $H_2$ introduction generally occurs during about the first 200 s from start of the engine 10 (i.e., the cold-start period), upon a signal from the control unit 24. In some embodiments, $H_2$ introduction may occur during other times to promote the catalyst article 22, for example, during periods of low temperature operation such as extended idling or low speed driving. The introduction of $H_2$ is modulated to provide a $\Delta\lambda$ (determined by the feedback sensor 18 in communication with control unit 24) value of about −0.345, or about −0.060, or about −0.014, when the temperature of the exhaust gas stream 12 is in the range of about 90° C. to about 550° C. as measured by temperature sensor 20. In some embodiments, introduction of $H_2$ is modulated when the temperature of the exhaust gas stream 12 is in the range of about 90° C. to about 190° C.

In some embodiments, the exhaust gas stream 12 contains no greater than about 20 vol % of $H_2$. In some embodiments, the exhaust gas stream 12 contains no greater than about 2 vol % of $H_2$. In some embodiments, the exhaust gas stream 12 contains no greater than about 0.5 vol % of $H_2$.

II. Method of Treating Engine Exhaust

In another aspect, there is provided a method of treating an exhaust gas stream from a gasoline engine, the method comprising contacting the exhaust gas stream with a TWC catalyst article located downstream of the gasoline engine and in fluid communication with the exhaust gas stream; introducing hydrogen gas ($H_2$) from a $H_2$ source into the exhaust gas stream upstream of the TWC catalyst article; and controlling a concentration by volume of $H_2$ in the exhaust gas stream upstream from the TWC catalyst article, wherein controlling the concentration by volume of $H_2$ comprises modulating the $H_2$ introduction.

In some embodiments, controlling a concentration by volume of $H_2$ comprises introducing $H_2$ into the exhaust gas stream when a temperature of the exhaust gas stream upstream from or inside the TWC catalyst article is in a range from about 90° C. to about 550° C. In some embodiments, controlling a concentration by volume of $H_2$ comprises introducing $H_2$ into the exhaust gas stream when a temperature of the exhaust gas stream upstream from or inside the TWC catalyst article is in a range from about 90° C. to about 190° C.

In some embodiments, the $H_2$ is introduced for about 200 seconds.

In some embodiments, modulating the $H_2$ introduction comprises: obtaining a signal from a feedback sensor and/or a temperature sensor, wherein the feedback sensor is located upstream from the TWC catalyst article, the temperature sensor is located upstream from or inside the TWC catalyst article, and both sensors are in contact with the exhaust gas stream; and controlling a quantity of $H_2$ introduced using said signal.

In some embodiments, the exhaust gas stream contains no greater than about 20 vol % of $H_2$. In some embodiments, the exhaust gas stream contains no greater than about 2 vol % of $H_2$. In some embodiments, the exhaust gas stream contains no greater than about 0.5 vol % of $H_2$.

In some embodiments, the method comprises introducing $H_2$ into the exhaust gas stream; and providing a $\Delta\lambda$ value no more negative than about −0.345, or from about −0.014 to about −0.345, for a period of time. In some embodiments, the period of time is about 200 seconds. In some embodiments, $\Delta\lambda$ is about −0.345. In some embodiments, $\Delta\lambda$ is about −0.060. In some embodiments, $\Delta\lambda$ is about −0.014.

According to the present disclosure, it has been found that introducing quantities of $H_2$ in the afore-mentioned volume % ranges, or to provide the range of $\Delta\lambda$ values as disclosed herein above, can, in some embodiments, enhance downstream catalyst activity and reduce hydrocarbon (HC) and nitrogen oxide ($NO_x$) emissions. In some embodiments, $NO_x$ conversion may be improved by introduction of $H_2$ without adversely affecting HC and CO conversion. Such methods may be useful in controlling emissions (e.g., $NO_x$) during the cold-start period when the downstream catalyst (e.g., a TWC catalyst) has not yet reached a temperature at which conversion of emission components is efficient. Without wishing to be bound by theory, it is believed that increasing the $H_2$ concentration may, for example, regenerate catalyst PGMs, and/or may minimize nitrate formation which would otherwise inhibit the PGMs from dissociating the molecular oxygen needed for low temperature oxidation.

In some embodiments, introducing $H_2$ further comprises generating $H_2$ during the combustion of gasoline in the gasoline engine, wherein generating $H_2$ comprises adding at least one $H_2$ generating component to the gasoline prior to combustion. In some embodiments, the at least one $H_2$ generating component comprises a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof. In some embodiments, the at least one $H_2$ generating component is added to the gasoline on board the vehicle. In some embodiments, the at least one $H_2$ generating component is added to the gasoline externally to the vehicle.

In other embodiments, introducing $H_2$ further comprises generating $H_2$ wherein generating $H_2$ comprises contacting the exhaust gas stream with an exhaust gas reforming catalyst.

In a further aspect, there is provided a method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system as disclosed herein.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, and examples herein. All patents and publications cited herein are incorporated by reference herein for the specific teachings thereof as noted, unless other specific statements of incorporation are specifically provided.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments. Any ranges cited herein are inclusive.

The disclosure is now described with reference to the following examples. Before describing several exemplary embodiments of the disclosure, it is to be understood that the disclosure is not limited to the details of construction or process steps set forth in the following description. The disclosure is capable of other embodiments and of being practiced or being carried out in various ways.

EXAMPLES

Example 1: Catalyst Article Preparation

A two-layered, Three-Way Conversion (TWC) catalyst article was prepared having a bottom coat comprising Pd and a top coat comprising Pd and Rh. For the bottom coat, an impregnated support material was prepared by incipient wetness impregnation of a Pd nitrate solution onto 0.40 g/in$^3$ of high-surface area γ-alumina, resulting in a loading of 18.6 g/ft$^3$ of Pd. The resulting impregnated powder support material was calcined at 550° C., made into slurry, and milled to obtain a first slurry. A second slurry was prepared by adding Pd nitrate solution to a slurry comprising 0.80 g/in$^3$ of ceria-zirconia composite (45 weight % $CeO_2$), resulting in a loading of 43.4 g/ft$^3$ of Pd. The resulting impregnated powder was calcined at 550° C., made into slurry, and milled. A single aqueous washcoat was formed by combining the first slurry in water, along with acid, with the second slurry. A barium promoter was also dispersed therein. Alumina binder was added to the washcoat slurry, which was then coated onto a monolith substrate at a loading of 1.46 g/in$^3$, the substrate dried in air, and calcined at 550° C. in air, to form the first (bottom) layer of the TWC catalyst article.

The second (top) layer coating was then prepared. Pd nitrate solution was incipient wetness impregnated onto 0.20 g/in$^3$ of high surface area lanthana-doped gamma-alumina, resulting in a Pd loading of 12.7 g/ft$^3$. The resulting impregnated powder support material was calcined at 550° C., made into slurry, and milled to obtain a first slurry. A second slurry was prepared by adding Pd nitrate solution to 0.40 g/in$^3$ of ceria-zirconia composite (29 weight % $CeO_2$), resulting in a loading of 12.7 g/ft$^3$ of Pd. The resulting impregnated powder support material was calcined at 550° C., made into a slurry, and milled. A third slurry was prepared by adding rhodium nitrate solution to 0.30 g/in$^3$ of high-surface area γ-alumina, resulting in a loading of 14.5 g/ft$^3$ Rh. The resulting impregnated powder support material was calcined at 550° C., made into slurry, and milled. The resulting slurry was combined with the first and second slurries. A lanthanum promoter was dispersed in the slurry, and alumina and zirconia binders were added to the slurry. The obtained slurry was then coated onto a monolithic substrate at a loading of 1.38 g/in$^3$, dried in air, and calcined at 550° C. in air. The total washcoat loading after calcination was 2.5 g/in$^3$.

The prepared catalyst articles were aged using either of two protocols (Aging 1 or Aging 2). For Aging 1, the article was aged at 995° C. for 40 hours under the ZDAKW (Zyklus des Abgaszentrums deutscher Automobilhersteller zur Katalysatorweiterentwicklung; Cycle of the Exhaust Center of German Automobile Manufacturers for Further Catalyst Development) protocol. For Aging 2, the article was hydrothermally aged at 950° C. for 12 hours in 10% $H_2O$/air.

Example 2: Laboratory Reactor Simulations

Catalyst articles (Aging 1 and Aging 2) were evaluated under EPA Federal Test Procedure (FTP-72) conditions on a laboratory reactor, measuring the hydrocarbon (HC), carbon monoxide (CO), and nitrogen oxides ($NO_x$) emissions. The FTP-72 driving cycle simulates the behaviour of the Model Year 2016 Ford Edge vehicle.

The laboratory reactor allowed evaluation of the impact of hydrogen injection on catalytic article performance under simulated, controlled exhaust conditions (temperature of the exhaust, air-to-fuel ratio, concentration of exhaust gas components, etc.) as would be experienced by an actual catalytic article inside the exhaust system of a vehicle. The laboratory reactor was also configured to simulate other driving cycle conditions (WLTC, etc.), as well as to run steady-state tests common in real-life field conditions (light-off, oxygen storage capacity tests, etc.). The laboratory reactor contained a UEGO sensor arrangement upstream of the catalytic article, and was configured to inject hydrogen gas into a simulated exhaust stream to vary the CO to $H_2$ ratio. The hydrogen source used for introduction of hydrogen was either a compressed hydrogen cylinder or a hydrogen generator.

In a first experiment, $H_2$ was introduced into the exhaust gas stream during the first 200 seconds of the FTP-72 cycle to provide a rich bias level of −0.014λ or −0.060λ, corresponding approximately to the UEGO measurement resulting from introducing 0.5 vol. % $H_2$ or 2.0 vol. % $H_2$, respectively. In a second experiment, $H_2$ was introduced into the exhaust gas stream during the first 200 seconds of the FTP-72 cycle at the levels of 0.5 vol. % $H_2$ or 2.0 vol. % $H_2$. Introduction of these quantities of $H_2$ provided median CO/$H_2$ volume ratios of 2.3 and 1.3, respectively. In each experiment, the standard FTP-72 cycle was denoted as "control." In each experiment, the introduction of $H_2$ was balanced with carrier gas such that the total Global Hourly Space Velocity (GHSV) was not affected relative to the control. The results of the two experiments are provided in Table 1.

The results demonstrated that in every case, introduction of $H_2$ improved $NO_x$ conversion relative to the control cycle. With 0.5% or 2% $H_2$ injection, HC and CO conversion was not significantly adversely effected (e.g., values remained the same or were reduced by <3%). Conversely, under λ-bias $H_2$ injection, HC and CO conversion values dropped by from 0.4% up to 19%.

TABLE 1

Conversion of HC/CO/NOx.

| Aging Protocol | Condition | Total HC Conversion (%) | CO Conversion (%) | $NO_x$ Conversion(%) |
|---|---|---|---|---|
| 1 | control | 97.5 | 98.7 | 88.4 |
| 1 | −0.014 λ | 93.0 | 97.2 | 90.4 |
| 1 | +0.5% $H_2$ | 97.7 | 98.4 | 90.5 |
| 1 | −0.060 λ | 78.5 | 93.0 | 90.4 |
| 1 | +2.0% $H_2$ | 95.0 | 95.9 | 91.1 |
| 2 | control | 98.0 | 99.0 | 87.9 |
| 2 | −0.014 λ | 97.6 | 98.3 | 90.0 |
| 2 | +0.5% $H_2$ | 98.2 | 99.0 | 90.1 |
| 2 | −0.060 λ | 88.9 | 95.2 | 90.5 |
| 2 | +2.0% $H_2$ | 96.9 | 97.2 | 90.6 |

In a further experiment, the catalytic articles were evaluated for HC, CO, and $NO_x$ light-off ($T_{50}$; the temperature at which a 50% conversion is achieved) under lean (λ=1.060) and rich (λ=0.960) conditions. These conditions represent typical conditions experienced by a catalyst article during operation in an actual gasoline vehicle exhaust system. For each condition, injection of $H_2$ (0.5 vol. %) was compared with no injection of $H_2$. All other parameters of the tests were identical. The results are provided in the following Table 2, which indicated that introduction of 0.5 vol. % $H_2$ significantly lowered HC, CO, and $NO^x$ $T_{50}$, demonstrating the improved catalytic activity of the catalyst article under these conditions.

TABLE 2

Light-off temperatures for HC/$NO^x$/CO

| Aging Protocol | Condition | $T_{50}$ Total HC (° C.) | $T_{50}$ $NO_x$ (° C.) | $T_{50}$ CO (° C.) |
|---|---|---|---|---|
| 1 | lean | 242.5 | — | 233.5 |
| 1 | rich | — | 210.3 | 261.5 |
| 1 | lean + $H_2$ | 197.0 | — | 194.5 |
| 1 | rich + $H_2$ | — | 202.8 | 218.3 |
| 2 | lean | 220.5 | — | 207.8 |
| 2 | rich | — | 188.8 | 207.3 |
| 2 | lean + $H_2$ | 182.5 | — | 177.0 |
| 2 | rich + $H_2$ | — | 182.5 | 194.8 |

The disclosure is now described with reference to the following embodiments and it is to be understood that the disclosure is not limited to these embodiments and is capable of other embodiments and of being practiced or being carried out in various ways.

1. A system for treating an exhaust gas stream from a gasoline engine, the system comprising:
   a catalyst article downstream of and in fluid communication with the gasoline engine;
   a source of hydrogen gas ($H_2$);
   a feedback sensor located upstream from the catalyst article and in contact with the exhaust gas stream; and
   a control unit in communication with the feedback sensor;
   wherein the system is configured to introduce $H_2$ from the $H_2$ source into the exhaust gas stream upstream of the catalyst article during a cold-start period, and wherein the feedback sensor is configured to provide $H_2$ in the exhaust gas stream by modulating the $H_2$ introduction.

2. The system of embodiment 1, wherein the catalyst article is chosen from a three-way conversion (TWC) catalyst article, a four-way conversion catalyst article, a selective catalytic reduction (SCR) catalyst article, a direct oxidation catalyst article, an ammonia oxidation (AMOx) catalyst article, and a catalyzed soot filter (CSF) article or combination thereof.

3. The system of embodiment 1, wherein the catalyst article comprises a substrate, a first catalyst layer disposed on the substrate, and a second catalyst layer disposed on the first catalyst layer, wherein:
   the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and
   the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support.

4. The system of embodiment 1, wherein the feedback sensor comprises a wide-band oxygen sensor (UEGO) and a temperature sensor.

5. The system of embodiment 1, wherein the source of $H_2$ is an on-board compressed hydrogen vessel.

6. The system of embodiment 1, wherein the source of $H_2$ is an on-board hydrogen generator.

7. The system of embodiment 5, wherein the on-board hydrogen generator comprises an alcohol reformer, an ammonia decomposition apparatus, an electrolysis apparatus, a fuel reformer, an exhaust gas reformer, or a combination thereof.

8. The system of embodiment 5, wherein the on-board hydrogen generator is an exhaust gas reformer comprising a catalytic reforming article located upstream from the catalytic article and in fluid communication with the exhaust gas stream.

9. The system of embodiment 5, wherein the on-board hydrogen generator comprises at least one $H_2$ generating component comprising a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof, and wherein the at least one $H_2$ generating component added to a gasoline fuel prior to combustion of said fuel in the gasoline engine.

10. The system of embodiment 1, further comprising a $H_2$ injection article upstream from the catalyst article, upstream from the feedback sensor, in fluid communication with the exhaust gas stream and with the $H_2$ source, and in communication with the control unit; the $H_2$ injection article configured to introduce $H_2$ from the $H_2$ source into the exhaust gas stream upstream of the catalyst article.

11. The system of embodiment 1, wherein the system is configured to introduce $H_2$ into the exhaust gas stream when the exhaust gas stream temperature upstream of or within the catalytic article is in a range from about 90° C. to about 190° C.

12. The system of embodiment 1, wherein, when a temperature of the exhaust gas stream upstream of or within the catalytic article is in a range from about 90° C. to about 550° C., the exhaust gas stream contains no greater than about 20 vol % of $H_2$.

13. The system of embodiment 1, wherein the exhaust gas stream contains no greater than about 2 vol % of $H_2$, or no greater than about 0.5 vol % of $H_2$.

14. The system of embodiment 1, configured to introduce $H_2$ into the exhaust gas stream to provide a $\Delta\lambda$ value of from about −0.014 to no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

15. The system of embodiment 14, wherein Δλ is about −0.060, or about −0.014.

16. A method of treating an exhaust gas stream from a gasoline engine, the method comprising:
contacting the exhaust gas stream with a catalyst article located downstream of the gasoline engine and in fluid communication with the exhaust gas stream;
introducing hydrogen gas ($H_2$) from a $H_2$ source into the exhaust gas stream upstream of the catalyst article; and
controlling a concentration by volume of $H_2$ in the exhaust gas stream upstream from the catalyst article, wherein controlling the concentration by volume of $H_2$ comprises modulating the $H_2$ introduction.

17. The method of embodiment 16, wherein the catalyst article is chosen from a three-way conversion (TWC) catalyst article, a four-way conversion catalyst article, a selective catalytic reduction (SCR) catalyst article, a direct oxidation catalyst article, an ammonia oxidation (AMOx) catalyst article, and a catalyzed soot filter (CSF) article or combination thereof.

18. The method of embodiment 16, wherein the catalyst article comprises a substrate, a first catalyst layer disposed on the substrate, and a second catalyst layer disposed on the first catalyst layer, wherein:
the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and
the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support.

19. The method of embodiment 16, wherein controlling comprises introducing $H_2$ into the exhaust gas stream when a temperature of the exhaust gas stream upstream from or inside the catalyst article is in a range from about 90° C. to about 550° C., or from about 90° C. to about 190° C.

20. The method of embodiment 16, wherein the $H_2$ is introduced for about 200 seconds.

21. The method of embodiment 16, wherein modulating the $H_2$ introduction comprises:
obtaining a signal from a feedback sensor and/or a temperature sensor, the feedback sensor located upstream from the catalyst article, and the temperature sensor located upstream from or inside the catalyst article, both sensors in contact with the exhaust gas stream; and
controlling a quantity of $H_2$ introduced using said signal.

22. The method of embodiment 21, wherein the exhaust gas stream contains no greater than about 20 vol % of $H_2$, no greater than about 2 vol % of $H_2$, or no greater than about 0.5 vol % of $H_2$.

23. The method of embodiment 26, comprising:
introducing $H_2$ into the exhaust gas stream; and
providing a Δλ value no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

24. The method of embodiment 23, wherein Δλ is about −0.060, or about −0.014.

25. The method of embodiment 26, wherein introducing $H_2$ further comprises generating $H_2$ during the combustion of gasoline in the gasoline engine, wherein generating $H_2$ comprises adding at least one $H_2$ generating component to the gasoline prior to combustion.

26. The method of embodiment 25, wherein the at least one $H_2$ generating component comprises a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof.

27. The method of embodiment 26, further comprising a vehicle comprising the gasoline engine and the catalyst article.

26. The method of embodiment 27, wherein the at least one $H_2$ generating component is added to the gasoline on board the vehicle, or is added to the gasoline externally to the vehicle.

28. The method of embodiment 16, wherein introducing $H_2$ further comprises generating $H_2$, wherein generating $H_2$ comprises contacting the exhaust gas stream with an exhaust gas reforming catalyst.

29. A method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system of any one of embodiment 1 to 15.

What is claimed is:
1. A system for treating an exhaust gas stream from a gasoline engine, the system comprising:

a catalyst article downstream of and in fluid communication with the gasoline engine, wherein the catalyst article comprises a substrate, a first catalyst layer disposed on the substrate, and a second catalyst layer disposed on the first catalyst layer, wherein:

the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support;

a source of hydrogen gas ($H_2$);

a feedback sensor located upstream from the catalyst article and in contact with the exhaust gas stream, wherein the feedback sensor comprises a wide-band oxygen sensor (UEGO) and a temperature sensor; and a control unit in communication with the feedback sensor;

an $H_2$ injection article upstream from the catalyst article, upstream from the feedback sensor, in fluid communication with the exhaust gas stream and with the $H_2$ source, and in communication with the control unit; and wherein the $H_2$ injection article configured to introduce $H_2$ from the $H_2$ source into the exhaust gas stream upstream of the catalyst article;

wherein the system is configured to introduce $H_2$ from the $H_2$ source into the exhaust gas stream upstream of the catalyst article during a cold-start period, and wherein the system is configured to introduce $H_2$ from the $H_2$ source into the exhaust gas stream when the exhaust gas stream temperature upstream of or within the catalytic article is in a range from about 90° C. to about 190° C., wherein the feedback sensor is configured to provide $H_2$ in the exhaust gas stream by modulating the $H_2$ introduction;

wherein the system is configured to introduce $H_2$ from the $H_2$ source into the exhaust gas stream to provide a $\Delta\lambda$ value of from about −0.014 to no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

2. The system of claim 1, wherein the catalyst article is chosen from a three-way conversion (TWC) catalyst article, a four-way conversion catalyst article, a selective catalytic reduction (SCR) catalyst article, a direct oxidation catalyst article, an ammonia oxidation (AMOx) catalyst article, and a catalyzed soot filter (CSF) article or a combination thereof.

3. The system of claim 1, wherein the source of $H_2$ is an on-board compressed hydrogen vessel, or an on-board hydrogen generator.

4. The system of claim 3, wherein the on-board hydrogen generator comprises an alcohol reformer, an ammonia decomposition apparatus, an electrolysis apparatus, a fuel reformer, an exhaust gas reformer, or a combination thereof, or an exhaust gas reformer comprising a catalytic reforming article located upstream from the catalytic article and in fluid communication with the exhaust gas stream, or comprises at least one $H_2$ generating component comprising a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof, and wherein the at least one $H_2$ generating component is added to a gasoline fuel prior to combustion of said fuel in the gasoline engine.

5. The system of claim 1, wherein, when a temperature of the exhaust gas stream upstream of or within the catalytic article is in a range from about 90° C. to about 550° C., the exhaust gas stream contains no greater than about 20 vol % of $H_2$.

6. The system of claim 1, wherein the exhaust gas stream contains no greater than about 2 vol % of $H_2$.

7. The system of claim 1, wherein $\Delta\lambda$ is about −0.060.

8. The system of claim 1, wherein $\Delta\lambda$ is about −0.014.

9. The system of claim 1, wherein the exhaust gas stream contains no greater than about 0.5 vol % of $H_2$.

10. A method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system of claim 1.

11. A method of treating an exhaust gas stream from a gasoline engine, the method comprising:

contacting the exhaust gas stream with a catalyst article located downstream of the gasoline engine and in fluid communication with the exhaust gas stream, wherein the catalyst article comprises a substrate, a first catalyst layer disposed on the substrate, and a second catalyst layer disposed on the first catalyst layer, wherein:

the first catalyst layer comprises a first palladium component, a first refractory metal oxide support, and a first oxygen storage component, wherein at least a portion of the first palladium component is impregnated on the first refractory metal oxide support, and another portion of the first palladium component is impregnated on the first oxygen storage component; and the second catalyst layer comprises a second palladium component, a second refractory metal oxide support, a second oxygen storage component, a rhodium component, and a third refractory metal oxide support, wherein at least a portion of the second palladium component is impregnated on the second refractory metal oxide support, and another portion of the second palladium component is impregnated on the second oxygen storage component, and the rhodium component is impregnated on the third refractory metal oxide support;

introducing hydrogen gas (H$_2$) from a H$_2$ source via an H$_2$ injection article into the exhaust gas stream upstream of the catalyst article, upstream from a feedback sensor, in fluid communication with the exhaust gas stream and with the H$_2$ source into the exhaust gas stream upstream of the catalyst article, wherein the feedback sensor comprises a wideband oxygen sensor (UEGO) and a temperature sensor; and controlling a concentration by volume of H$_2$ in the exhaust gas stream upstream from the catalyst article, wherein controlling the concentration by volume of H$_2$ comprises modulating the H$_2$ introduction, wherein controlling comprises introducing H$_2$ into the exhaust gas stream when a temperature of the exhaust gas stream upstream from or inside the catalyst article is in a range from about 90° C. to about 550° C., or from about 90° C. to about 190° C.;

introducing H$_2$ into the exhaust gas stream; and providing a $\Delta\lambda$ value no more negative than about −0.345 for a period of time, wherein:

$$\Delta\lambda = \bar{\lambda} - \lambda°;$$

$\lambda°$ is a pre-defined value; and $\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

12. The method of claim 11, wherein the catalyst article is chosen from a three-way conversion (TWC) catalyst article, a four-way conversion catalyst article, a selective catalytic reduction (SCR) catalyst article, a direct oxidation catalyst article, an ammonia oxidation (AMOx) catalyst article, and a catalyzed soot filter (CSF) article or a combination thereof.

13. The method of claim 11, wherein the H$_2$ is introduced for about 200 seconds.

14. The method of claim 11, wherein modulating the H$_2$ introduction comprises:

obtaining a signal from a feedback sensor, a temperature sensor, or a combination thereof, wherein the feedback sensor is located upstream from the catalyst article, the temperature sensor located upstream from or inside the catalyst article, and both sensors are in contact with the exhaust gas stream; and controlling a quantity of H$_2$ introduced using said signal.

15. The method of claim 14, wherein the exhaust gas stream contains no greater than about 20 vol % of H$_2$, no greater than about 2 vol % of H$_2$, or no greater than about 0.5 vol % of H2.

16. The method of claim 14, wherein the exhaust gas stream contains no greater than about 2 vol % of H$_2$.

17. The method of claim 14, wherein the exhaust gas stream contains no greater than about 0.5 vol % of H$_2$.

18. The method of claim 11, wherein $\Delta\lambda$ is about −0.060.

19. The method of claim 11, wherein $\Delta\lambda$ is about −0.014.

20. The method of claim 11, wherein introducing H$_2$ further comprises generating H2 during the combustion of gasoline in the gasoline engine, wherein generating H$_2$ comprises adding at least one H$_2$ generating component to the gasoline prior to combustion.

21. The method of claim 20, wherein the at least one H$_2$ generating component comprises a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof.

22. The method of claim 21, further comprising a vehicle, wherein the vehicle comprises the gasoline engine and the catalyst article.

23. The method of claim 22, wherein the at least one H$_2$ generating component is added to the gasoline on board the vehicle, or is added to the gasoline externally to the vehicle.

24. The method of claim 11, wherein introducing H$_2$ further comprises generating H$_2$, wherein generating H$_2$ comprises contacting the exhaust gas stream with an exhaust gas reforming catalyst.

* * * * *